(12) United States Patent
Isaac et al.

(10) Patent No.: US 11,214,360 B2
(45) Date of Patent: Jan. 4, 2022

(54) ADJUSTABLE LANDING GEAR ASSEMBLY FOR USE IN AIRCRAFT

(71) Applicant: Bell Textron Inc., Fort Worth, TX (US)

(72) Inventors: Mark Loring Isaac, Fort Worth, TX (US); Kent Edwards Donaldson, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 162 days.

(21) Appl. No.: 16/589,201

(22) Filed: Oct. 1, 2019

(65) Prior Publication Data
US 2021/0094675 A1 Apr. 1, 2021

(51) Int. Cl.
*B64C 25/14* (2006.01)
*B64C 25/00* (2006.01)
*B64C 29/00* (2006.01)

(52) U.S. Cl.
CPC ............ *B64C 25/14* (2013.01); *B64C 25/001* (2013.01); *B64C 29/0033* (2013.01); *B64C 2025/008* (2013.01)

(58) Field of Classification Search
CPC ....... B64C 25/14; B64C 25/001; B64C 25/40; B64C 2025/008; B64C 2025/125; B64C 29/0033
See application file for complete search history.

(56) References Cited

U.S. PATENT DOCUMENTS

| | | | | |
|---|---|---|---|---|
| 4,228,975 | A | * | 10/1980 | Sealey ............... B64C 25/14 244/102 R |
| 2018/0001999 | A1 | * | 1/2018 | Page .................. B64C 39/10 |
| 2018/0208305 | A1 | * | 7/2018 | Lloyd ................. B60L 50/61 |
| 2018/0244373 | A1 | * | 8/2018 | Mellor ................ B64C 25/26 |

* cited by examiner

*Primary Examiner* — Rodney A Bonnette
(74) *Attorney, Agent, or Firm* — Lightfoot & Alford PLLC

(57) ABSTRACT

A landing gear assembly for an aircraft includes a landing member and an actuation mechanism coupled to the landing member. The actuation mechanism is configured to selectively actuate the landing member into a first landing position and a second landing position. The landing member is configured to support the aircraft in either the first landing position or the second landing position.

20 Claims, 12 Drawing Sheets

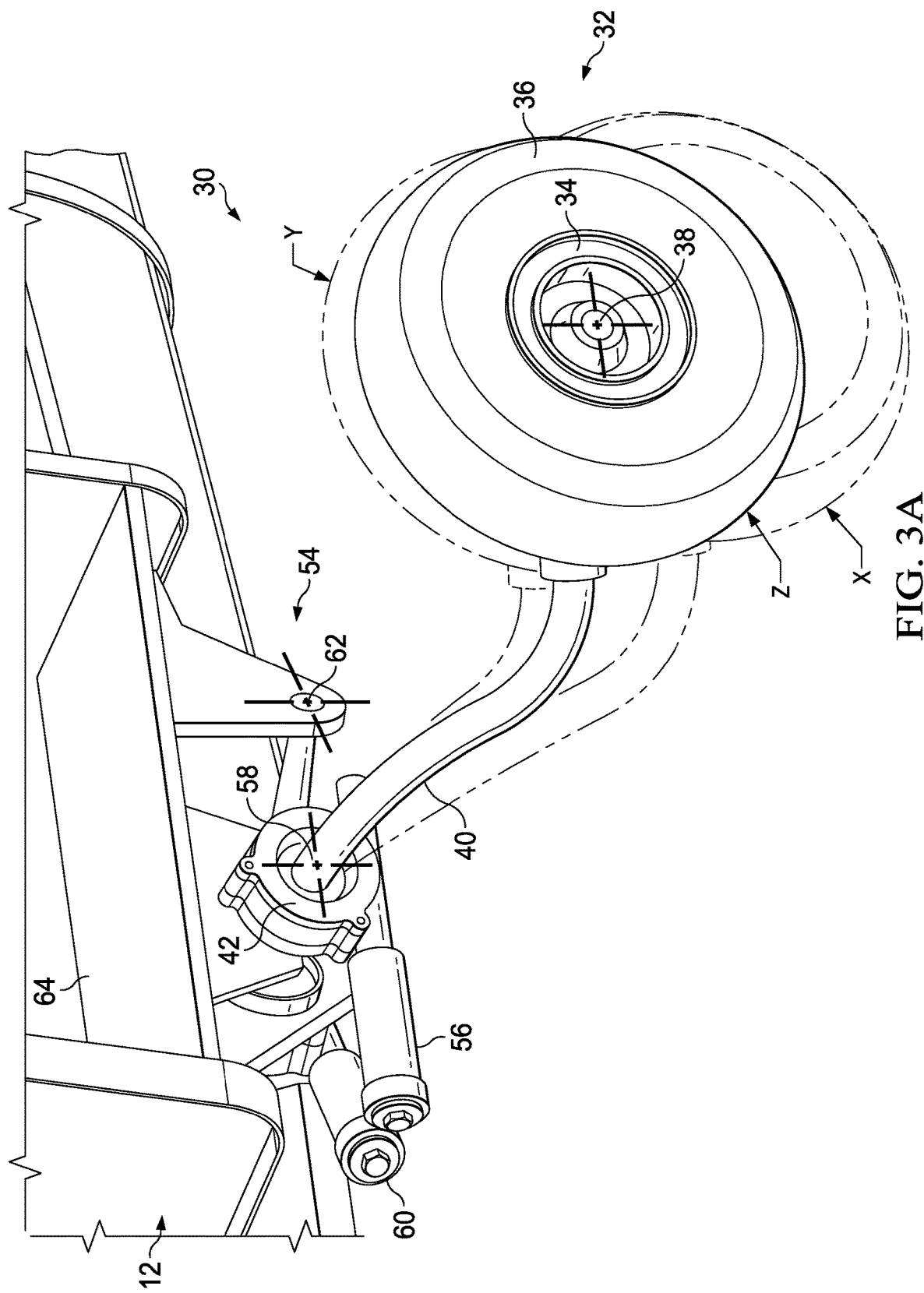

ADJUSTABLE LANDING GEAR ASSEMBLY FOR USE IN AIRCRAFT

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE DISCLOSURE

The present disclosure relates, in general, to an adjustable landing gear assembly optimized for both vertical and runway landings and takeoffs.

BACKGROUND

One example of an aircraft is a tiltrotor. A tiltrotor aircraft can operate in a helicopter flight mode by tilting its nacelles upright and a forward flight mode by tilting its nacelles forward. In helicopter flight mode, the tiltrotor aircraft generates a lifting force by rotating a plurality of rotor blades, which allows the tiltrotor aircraft to make vertical takeoffs or vertical landings with little or no forward momentum. Conversely, in forward flight mode, the tiltrotor aircraft generates a lifting force by running an airflow over an aerodynamic wing surface, which allows the tiltrotor aircraft to make runway takeoffs or runway landings with a substantial amount of forward momentum.

A landing gear assembly is required for vertical landings, vertical takeoffs, runway landings and runway takeoffs. Often, the landing gear assembly is comprised of a forward landing gear system and an aft main landing gear system; however, the ideal placement of the main landing gear system may differ based on the type of landing or takeoff being attempted. For example, for vertical landings or vertical takeoffs, it is advantageous to maximize the profile of the landing gear assembly by moving the main landing gear system further aft. Conversely, for runway landings or runway takeoffs, it is advantageous to place the main landing gear system within proximity of the tiltrotor aircraft's center of gravity by moving the main landing gear system further forward. Accordingly, a need has arisen for an adjustable landing gear assembly that can accommodate vertical landings and vertical takeoffs and runway landings and runway takeoffs.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are oblique views of the main landing gear system in various positions;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
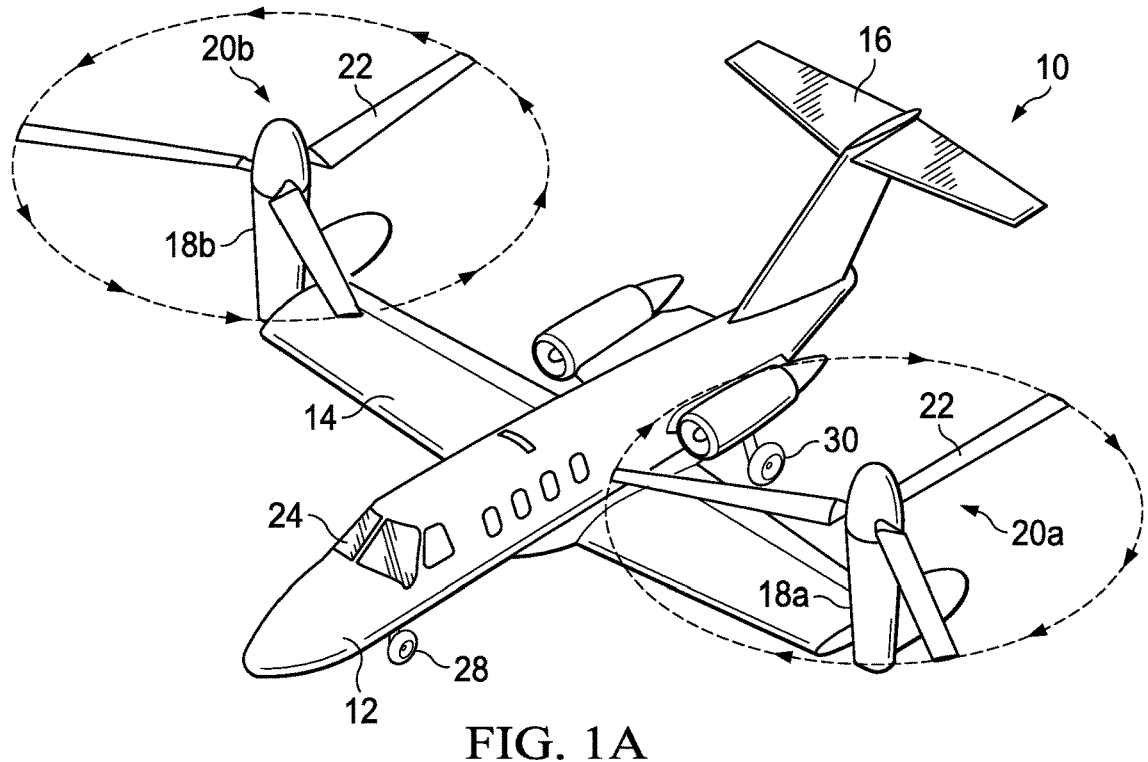
FIGS. 1A-1D are schematic illustrations of a stop-fold tiltrotor aircraft in various flight modes in accordance with embodiments of the present disclosure.
Figure 1B:
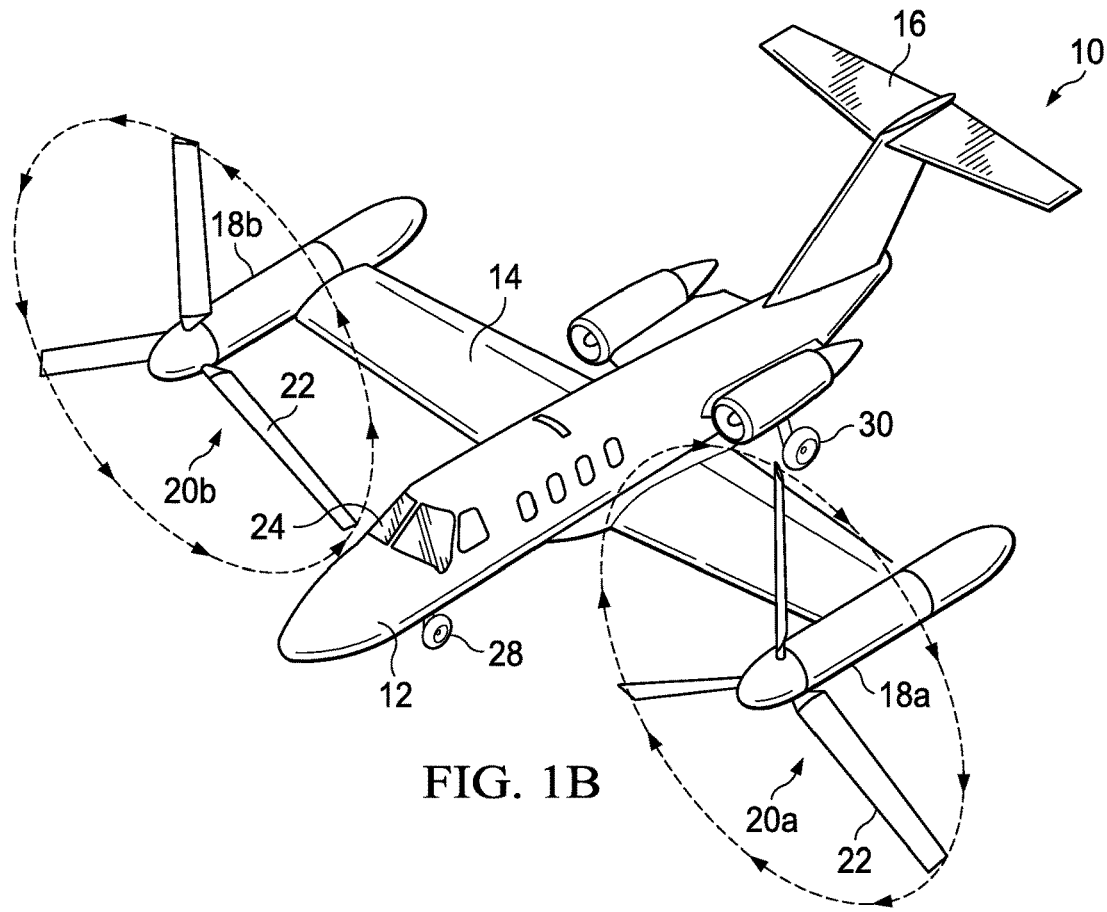
Figure 1C:
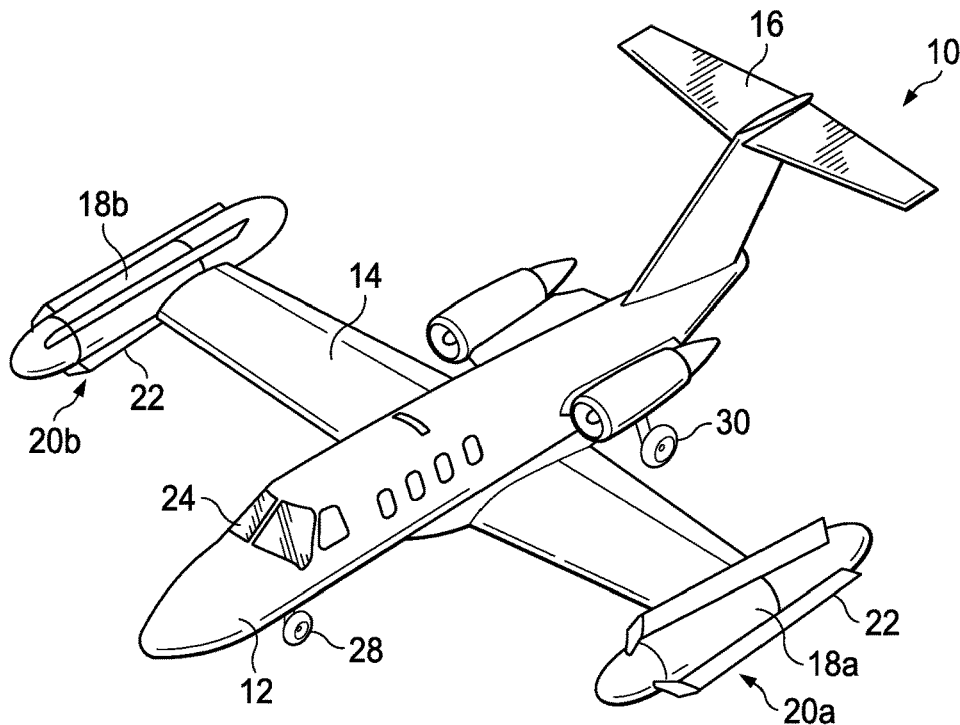
Figure 1D:
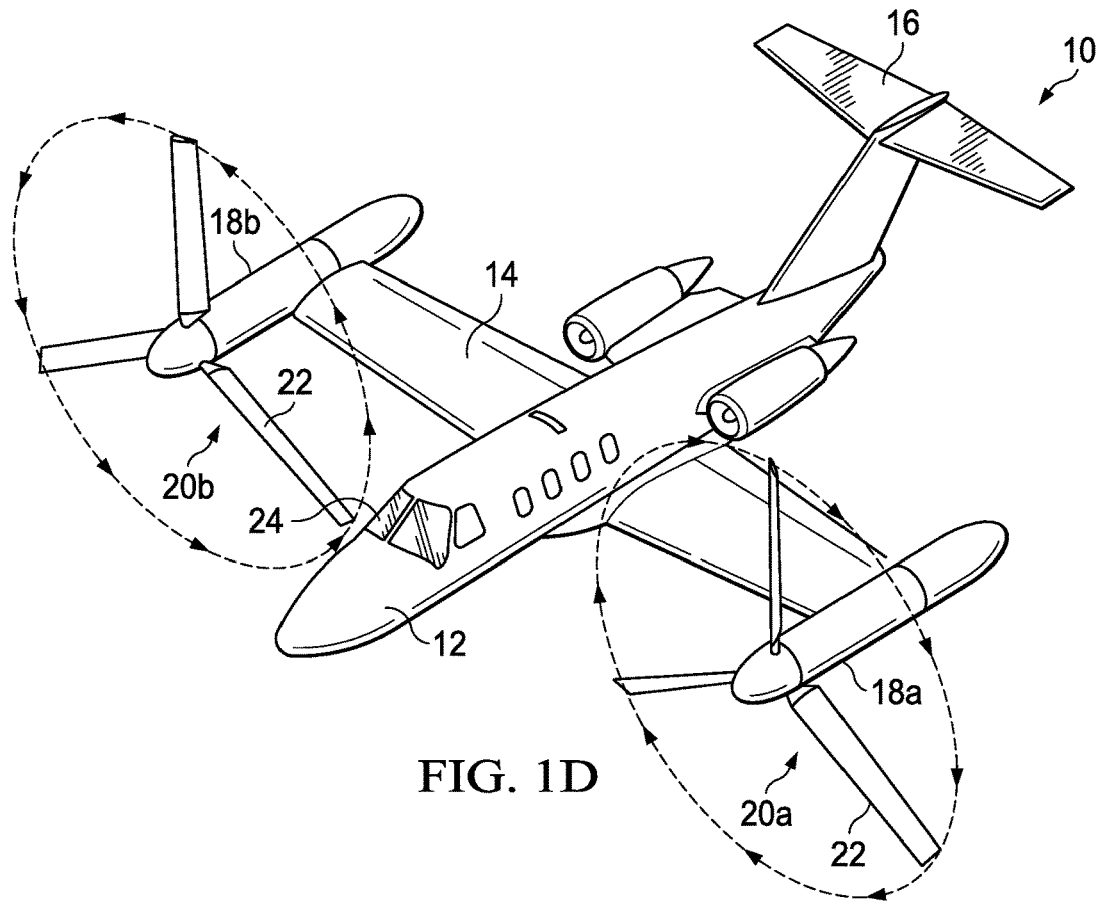

Referring to FIGS. 1A-1D in the drawings, a stop-fold tiltrotor aircraft 10 is schematically illustrated. Aircraft 10 includes a fuselage 12, a cockpit 24, wings 14, and a tail assembly 16. Located proximate the outboard ends of wings 14 are pylon assemblies 18a, 18b that are rotatable relative to wings 14 between a generally vertical orientation, as best seen in FIG. 1A, and a generally horizontal orientation, as best seen in FIGS. 1B-1D. Pylon assemblies 18a, 18b include rotor assemblies 20a, 20b, respectively; wherein, rotor assemblies 20a, 20b include a plurality of rotor blades 22. Situated along the bottom of the fuselage 12, aircraft 10 further includes a forward landing gear system 28 and two main landing gear systems 30. Only a left main landing gear system is shown and a right main landing gear system is substantially similar to the left main landing gear system, but provided as substantially a symmetrical mirror image of the left main landing gear system. The forward landing gear system 28 is centered near the nose of the aircraft 10 proximate to the cockpit 24. The main landing gear systems 30 are further aft of the forward landing gear system 28 to the left-hand and right-hand sides of the aircraft 10, respectively. The main landing gear systems 30 share a similar configuration and are symmetrically aligned with one another about the center-width of the aircraft 10. The main landing gear systems 30 can be selectively actuated forward and aft into multiple lengthwise positions along the aircraft 10. Generally, the main landing gear systems 30 synchronously actuate into the same lengthwise positions; but, the main landing gear systems 30 could also independently actuate into different lengthwise positions. The forward landing gear system 28 and main landing gear systems 30 can be actuated to at least partially extend outside the aircraft 10, as best seen in FIGS. 1A-1C, or can be actuated to be at least partially stowed inside the aircraft 10, as best seen in FIG. 1D.

FIG. 1A illustrates aircraft 10 in a helicopter flight mode, in which tiltrotor assemblies 20a, 20b rotate in a substantially horizontal plane to provide a lifting thrust, such that aircraft 10 flies much like a conventional helicopter. In helicopter flight mode, the forward landing gear system 28 and the main landing gear systems 30 can support the weight of the aircraft 10 during landings and takeoffs. In helicopter flight mode, the aircraft 10 can make vertical landings and vertical takeoffs that require little or no forward momentum on helipads or other suitable ground surfaces. To better accommodate vertical landings and vertical takeoffs, the main landing gear systems 30 are in a VTOL (Vertical Takeoff and Landing) landing position, wherein the main landing gear systems 30 are moved to rest further aft.

FIG. 1B illustrates aircraft 10 in a forward flight mode, in which tiltrotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In forward flight mode, the forward landing gear system 28 and the main landing gear systems 30 can support the weight of the aircraft 10 during landings and takeoffs. If the rotor blades 22 are not prohibitively large, in forward flight mode, the aircraft 10 can make runway landings and runway takeoffs that require a substantial amount of forward momentum on airport runways or other suitable ground surfaces. To better accommodate runway landings and runway takeoffs, the main landing gear systems 30 are in an airplane landing position, wherein the main landing gear systems 30 are moved to rest further forward.

FIG. 1C illustrates aircraft 10 in an alternate forward flight mode, in which the rotor blades 22 of tiltrotor assemblies 20a, 20b have been folded to be oriented substantially parallel to respective pylon assemblies 18a, 18b to minimize the drag force generated by the rotor blades 22 and prevent the rotor blades 22 from striking ground surfaces during landings and takeoffs. Like in the forward flight mode, in the alternate forward flight mode, the aircraft 10 can make runway landings or runway takeoffs that require a substantial amount of forward momentum on airport runways or other suitable ground surfaces. To better accommodate runway landings and runway takeoffs, the main landing gear systems 30 are in the above-described airplane landing position.

FIG. 1D illustrates aircraft 10 in the forward flight mode. In the forward flight mode, the aircraft 10 can stow the forward landing gear system 28 and the main landing gear systems 30 into a stowage position. In the stowage position, an increased portion of each of the forward landing gear system 28 and the main landing gear systems 30 are stowed into one or more interior spaces of the aircraft 10. It should be noted that, while FIG. 1D illustrates aircraft 10 in the forward flight mode, the forward landing gear system 28 and the main landing gear systems 30 can also be stowed into the stowage position in both the helicopter flight mode and the alternate forward flight mode.

Figure 2A:
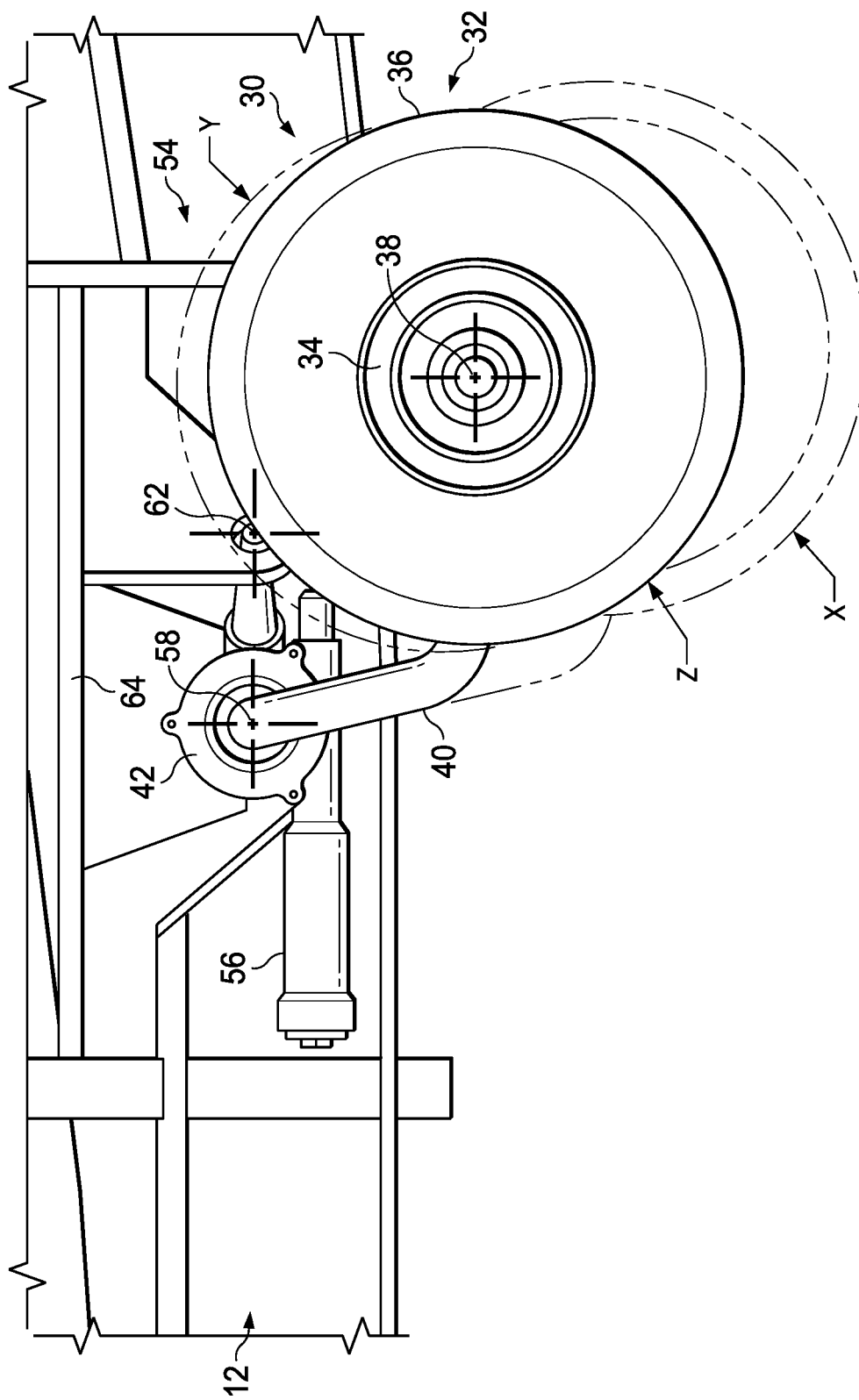
FIGS. 2A-2C are side views of a main landing gear system in various positions.
Figure 2B:
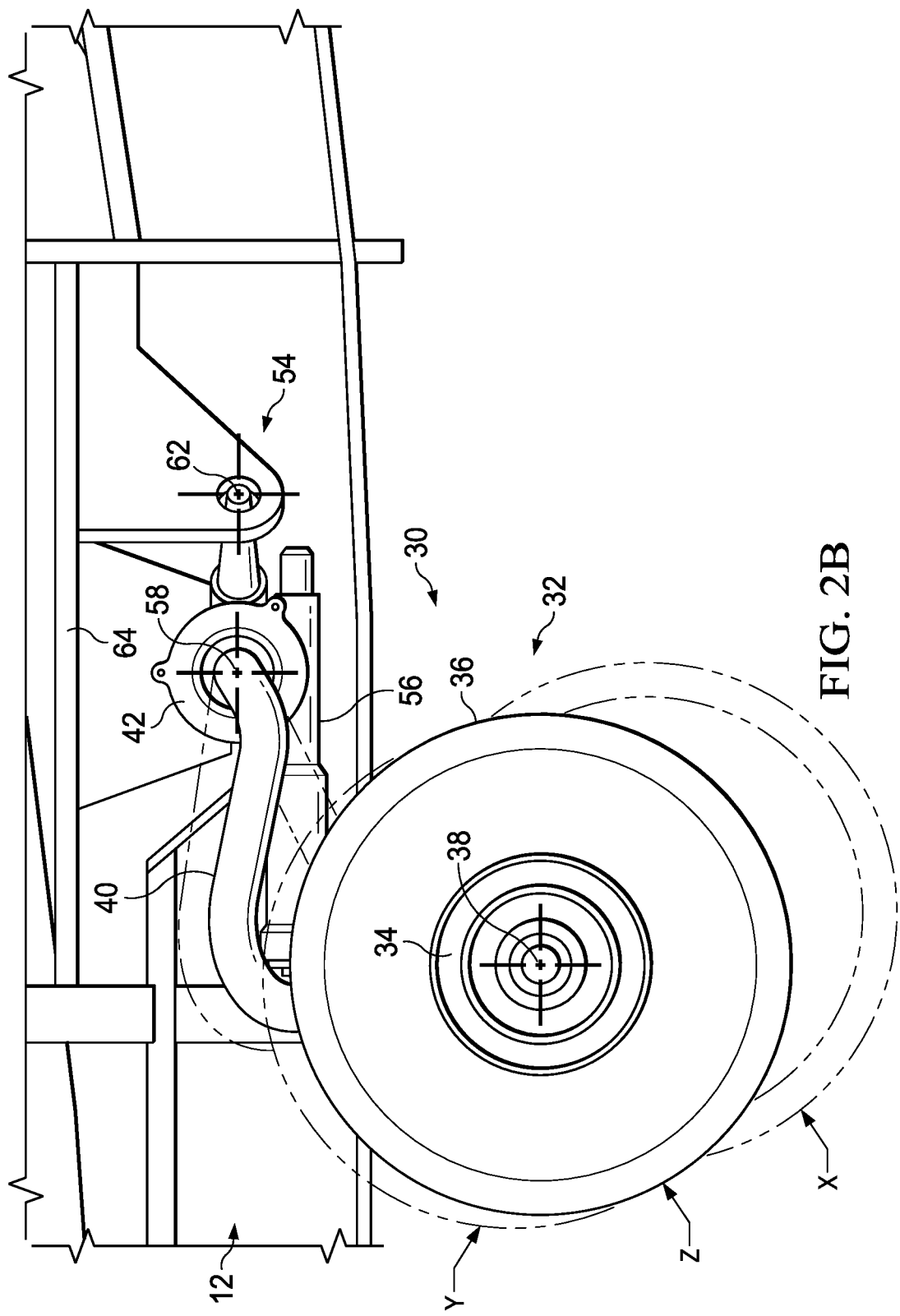
Figure 2C:
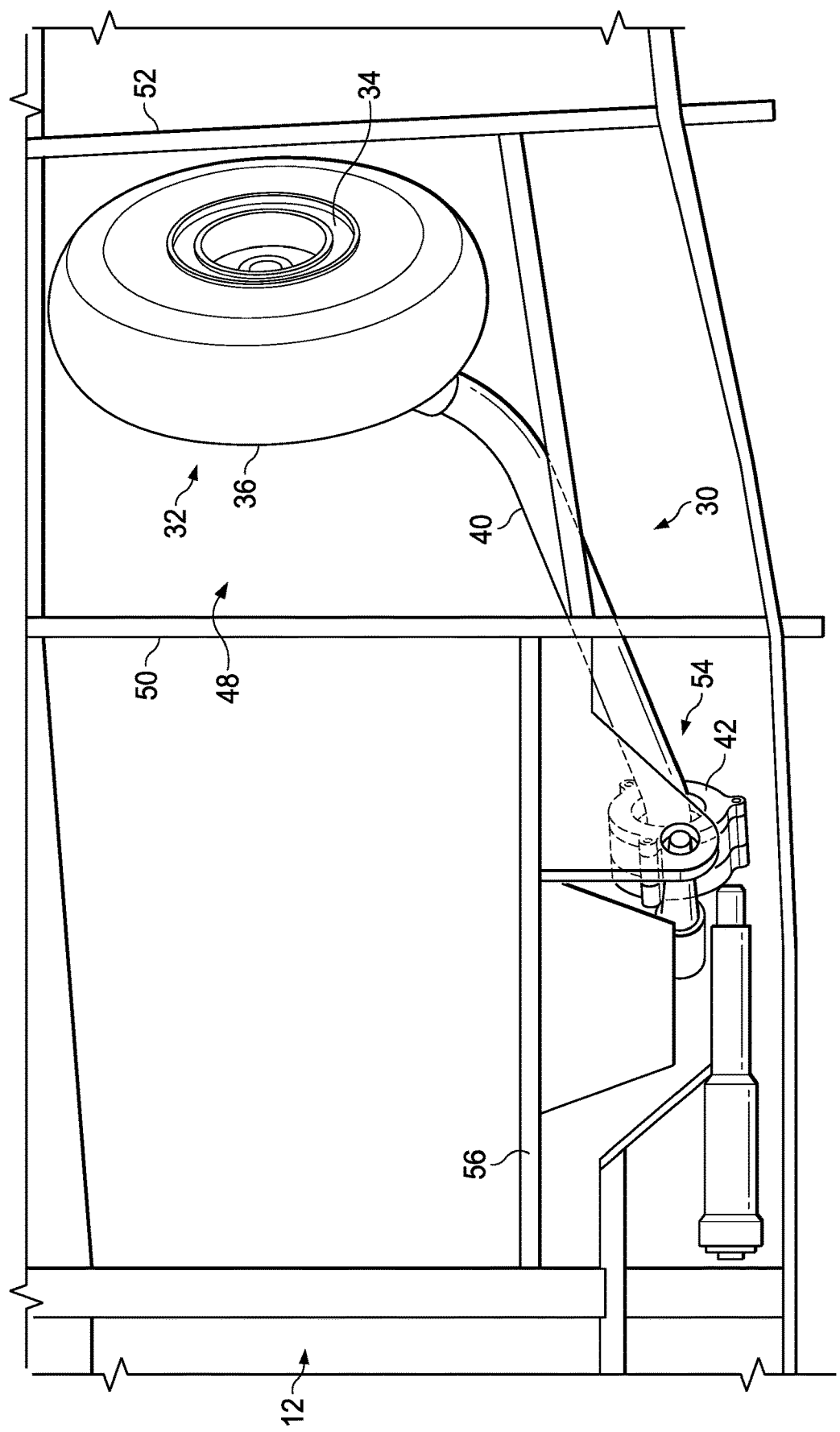

FIGS. 2A-2C illustrate side views of a main landing gear system 30 situated beneath the fuselage 12. It should be noted that the below discussion of the main landing gear system 30 is made with reference to a left main landing gear system but is similarly applicable to a right main landing gear system that is not shown. The main landing gear system 30 comprises an actuation mechanism 54 and a wheel assembly 32; wherein, the wheel assembly 32 comprises a wheel axle 34, a tire 36, and an axle spindle axis 38 about which the wheel assembly 32 rotates. The actuation mechanism 54 comprises an outer structure 64, a first actuator 56, and a second actuator 60. The outer structure 64 houses both the first actuator 56 and second actuator 60 and couples the actuation mechanism 54 to the fuselage 12. The actuation mechanism 54 is coupled to the wheel assembly 32 by a curved two-ended tubular strut 40. The first end of the tubular strut 40 is coupled to the wheel assembly 32 at the wheel axle 34 and the second end of the tubular strut 40 is coupled to the actuation mechanism 54 at a tubular insert 42 coupled to the outer structure 64. During landings, the weight force of aircraft 10 is distributed from the wheel assembly 32 into the tubular strut 40. From the tubular strut 40, the weight force then travels into the tubular insert 42 and the outer structure 64, where it is then distributed throughout the fuselage 12. To better distribute the weight force of the aircraft 10, the tubular strut 40 is at least partially elastic. As a result, during landings, when the tire 36 contacts ground surfaces, the wheel assembly 32 and tubular strut 40 oscillate between an initial position X, an upward position Y, and a settled position Z, as best seen in FIGS. 2A-2B. The first actuator 56 actuates the tubular strut 40 and wheel assembly 32, about a first actuator axis 58. The first actuator 56 can potentially be powered by one or more hydraulic or pneumatic pumps, motors, batteries, generators, and other suitable devices. The first actuator 56 selectively moves the wheel assembly 32 between the VTOL landing position and the airplane landing position, as best seen in FIG. 2A and FIG. 2B, respectively. It should be noted that as the wheel assembly 32 moves between the VTOL landing position and the airplane landing position, the wheel assembly 32 remains parallel to the fuselage 12 and is oriented to move the aircraft 10 in a straight forward direction. The second actuator 60 selectively moves the wheel assembly 32 and tubular strut 40 about a second actuator axis 62 to extend the wheel assembly 32 away from the fuselage 12 or to stow the wheel assembly 32 nearer or at least partially within the fuselage 12. Like the first actuator 56, the second actuator 60 can potentially be powered by one or more hydraulic or pneumatic pumps, motors, batteries, generators, and other suitable devices. The second actuator 60 selectively moves the wheel assembly 32 about the second actuator axis 62 between the airplane landing position and the stowage position, as best seen in FIG. 2B and FIG. 2C, respectively.

FIG. 2A illustrates the left main landing gear system 30 in the VTOL landing position. In the VTOL landing position, the wheel assembly 32 is positioned aft towards the rear of the actuation mechanism 54. The wheel assembly 32 is also raised, relative to the fuselage 12, due to the curved geometry of the tubular strut 40. The elastic nature of the tubular strut 40 also causes the wheel assembly 32 to shift upwards during landings and takeoffs, as shown.

FIG. 2B illustrates the left main landing gear system 30 in the airplane landing position. In the airplane landing position, the wheel assembly 32 is positioned forward towards the front of the actuation mechanism 54. The wheel assembly 32 is also lowered, relative to the fuselage 12, due to the curved geometry of the tubular strut 40. The elastic nature of the tubular strut 40 also causes the wheel assembly 32 to shift upwards during landings and takeoffs, as shown.

FIG. 2C illustrates the main landing gear system 30 in the stowage position. In the stowage position, the wheel assembly 32 is internally stowed within the fuselage 12 in a storage compartment 48 situated between a first fuselage rib 50 and a second fuselage rib 52. While in the stowage position, the wheel assembly 32 is situated above and behind the actuation mechanism 54.

Figure 2D:
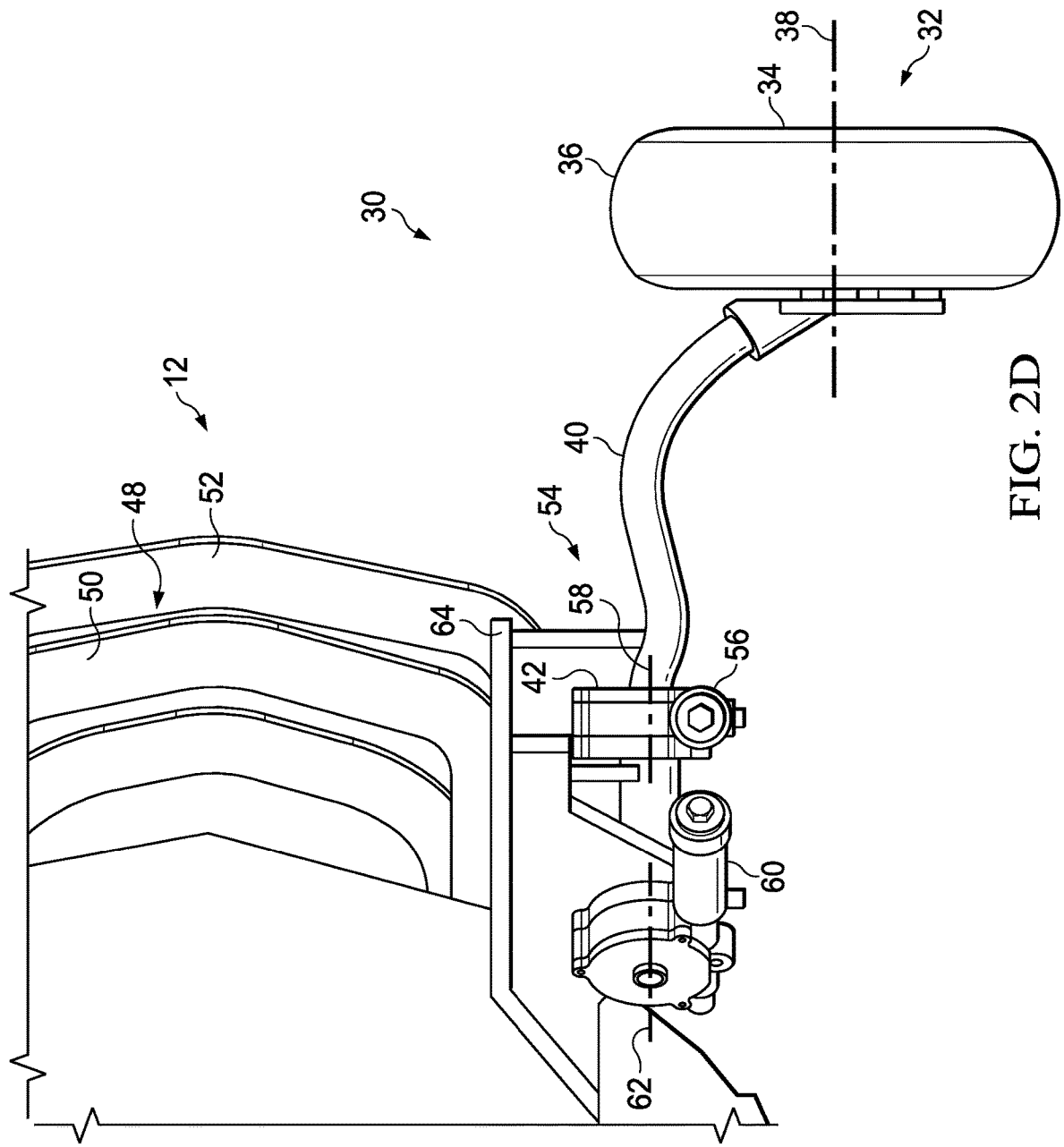
FIG. 2D is a front view of the main landing gear system in an airplane landing position.

FIG. 2D is a front view of the main landing gear system 30 in the airplane landing position.

Figure 3B:
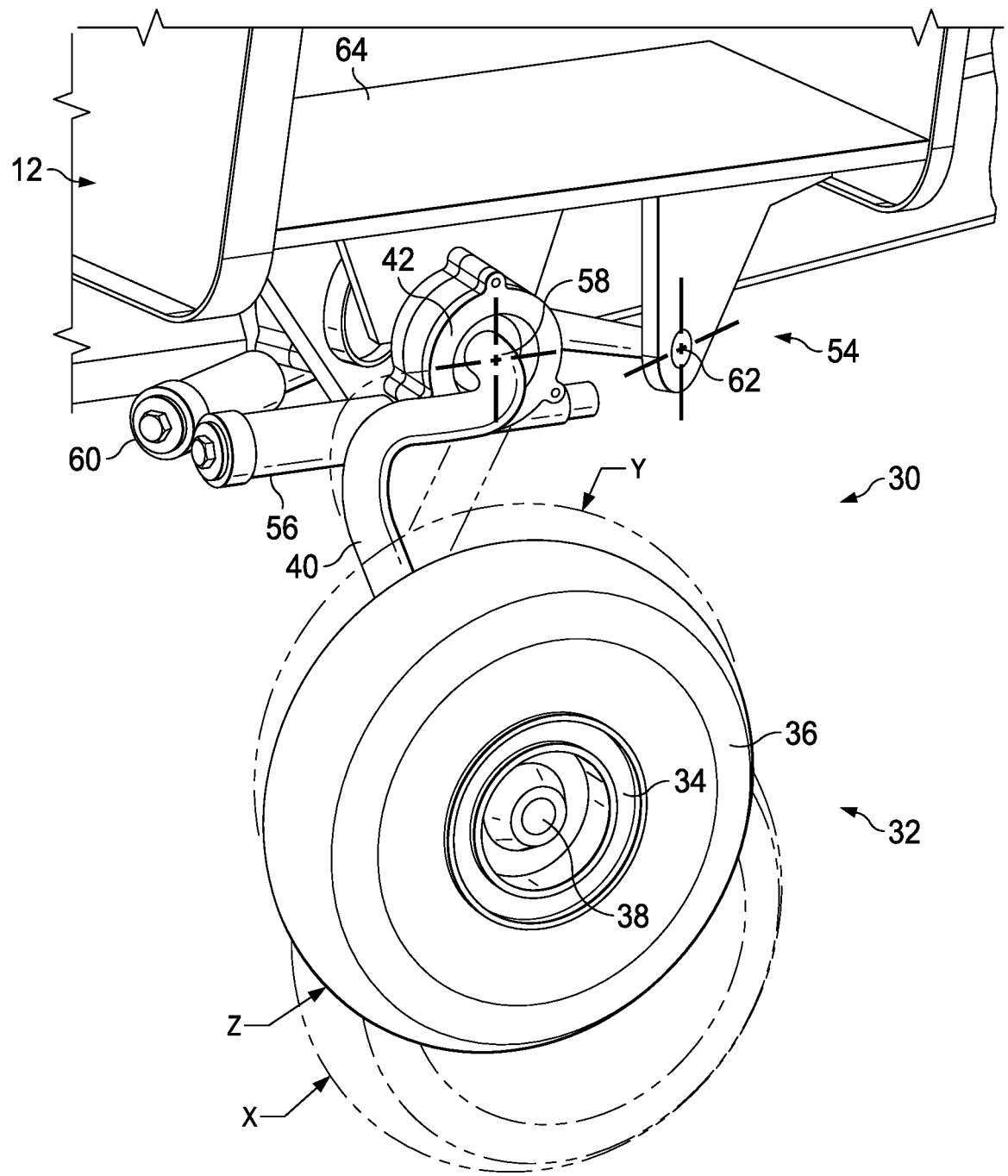
Figure 3C:
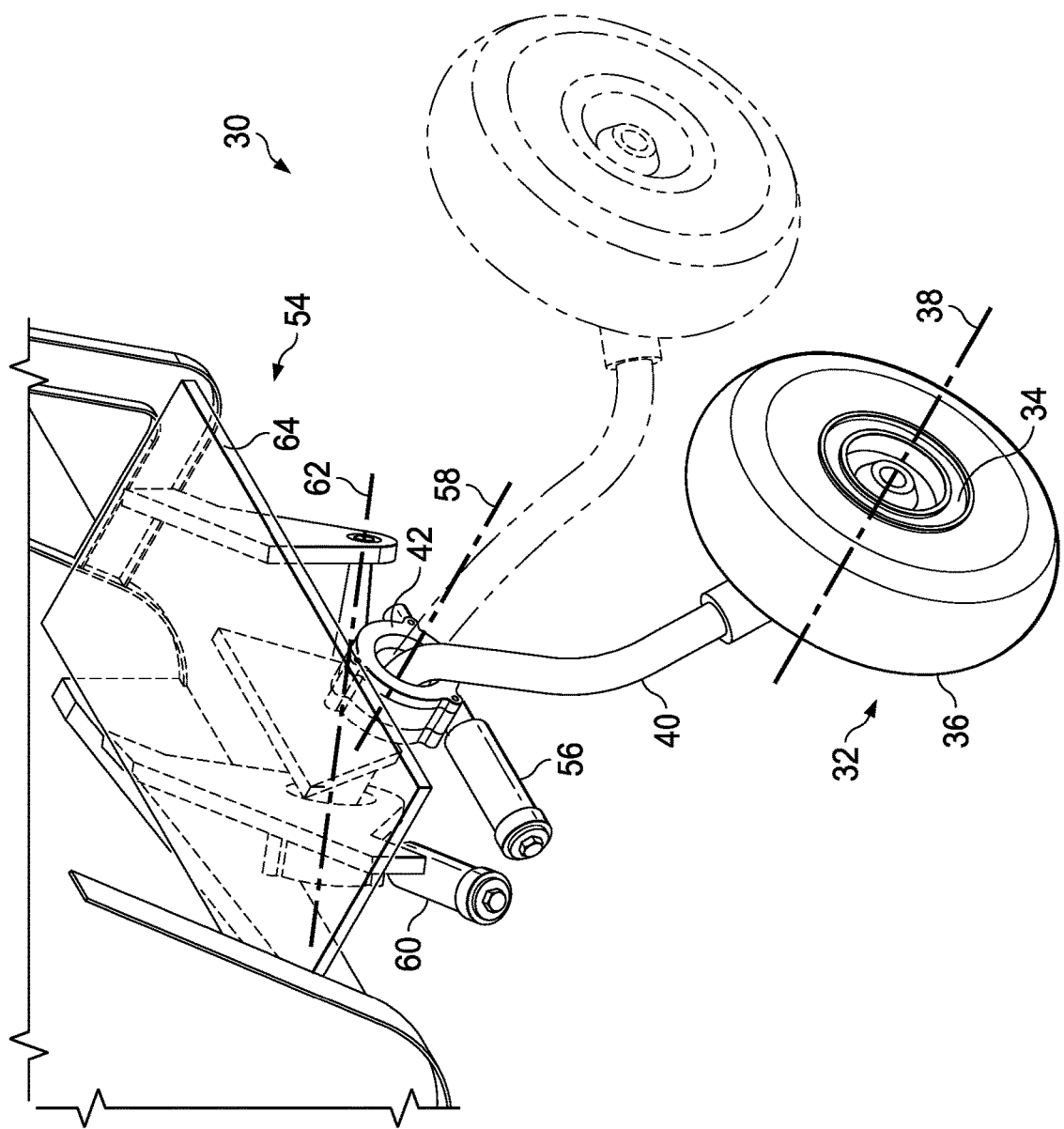

FIGS. 3A and 3B show oblique views of the main landing gear system 30 comprising the wheel assembly 32 and the actuation mechanism 54. FIGS. 3A and 3B show the left main landing gear system 30 in the VTOL landing position and the airplane landing position, respectively. FIG. 3C is another oblique view of the main landing gear system 30 showing the main landing gear system 30 in the airplane landing position and alternatively, using dashed lines, the VTOL landing position.

Figure 4:
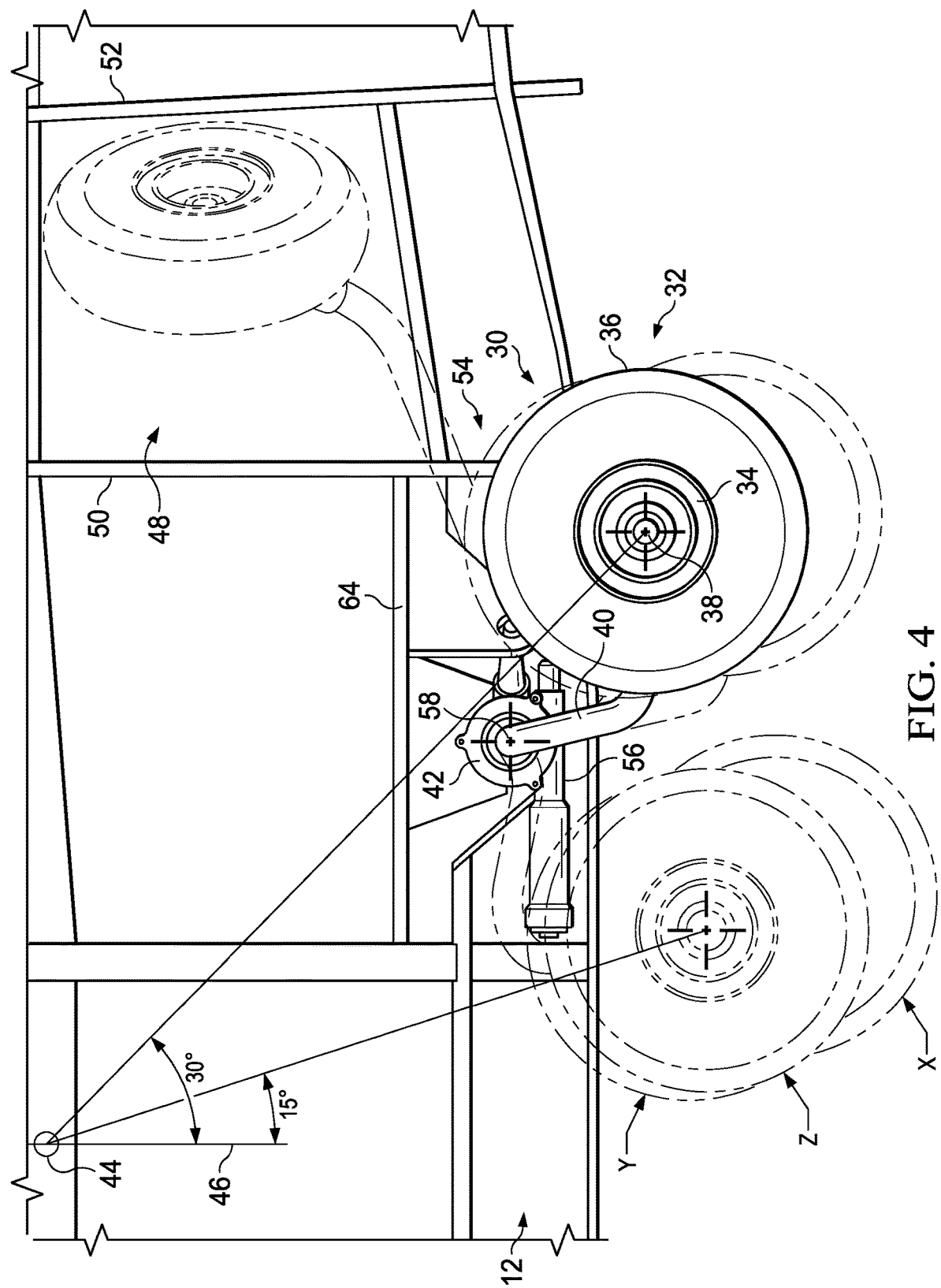
FIG. 4 is an illustration of an embodiment of a fuselage with a center of gravity and a main landing gear system in various positions.

Referring to FIG. 4, a simplified side-view of the fuselage 12 with an aircraft center of gravity 44 and left main landing gear system 30 is shown. The left main landing gear system 30 can be moved to and between the VTOL landing position, the airplane landing position, and the stowage position, as shown. The aircraft center of gravity 44 is generally situated above and forward of the left main landing gear system 30. An angle is formed by the aircraft center of gravity 44 and the axle spindle axis 38 about a vertical plane 46. The angle shrinks and grows as the wheel assembly 32 moves between the VTOL landing position and the airplane landing position, respectively. In the illustrated embodiment, during landings and takeoffs when the wheel assembly 32 shifts upwards, the angles formed in the VTOL landing position and the airplane landing position are approximately 30 degrees and 15 degrees, respectively.

Figure 5:
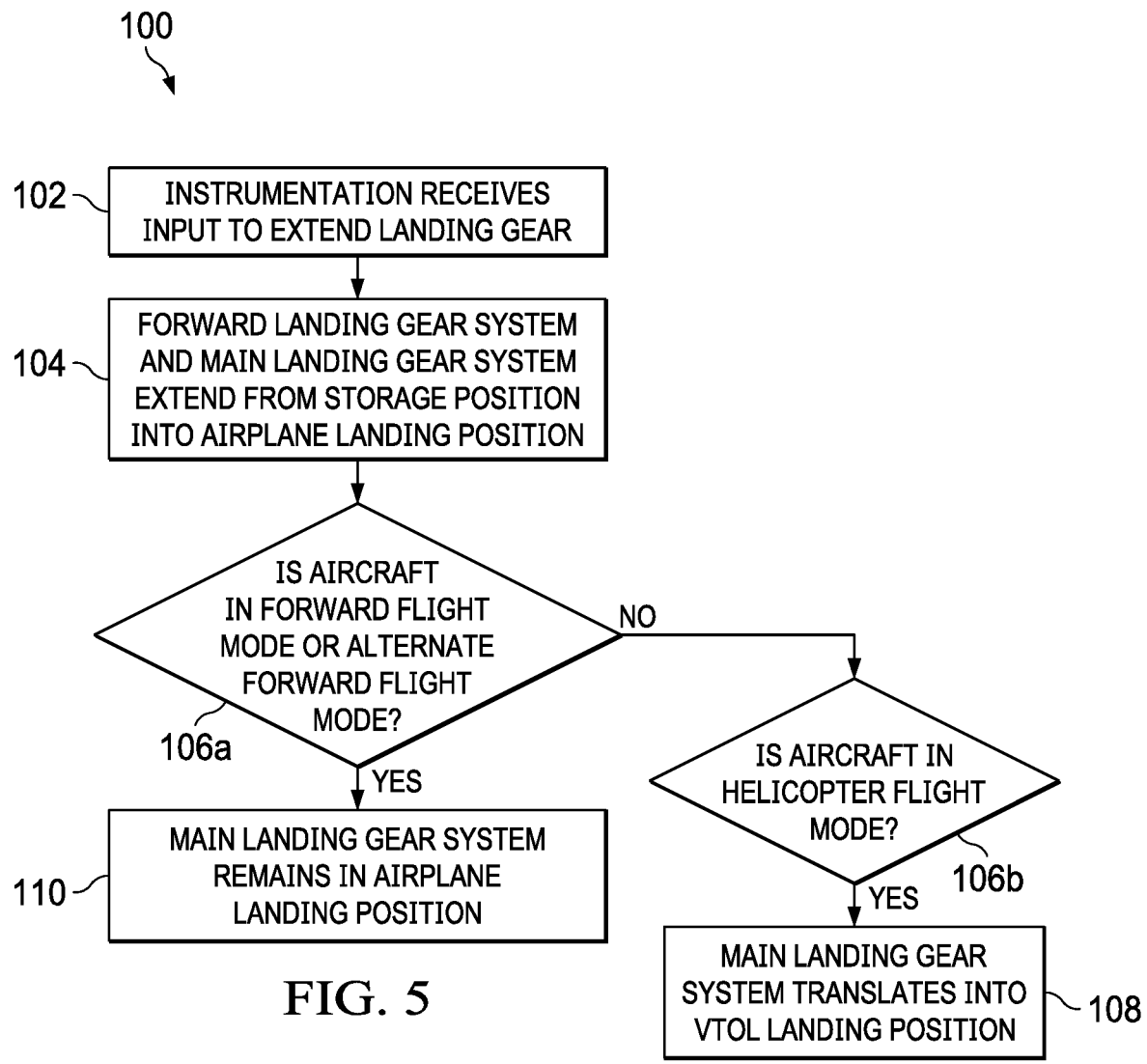
FIG. 5 is a flowchart of a method 100 for extending a landing gear.

Referring to FIG. 5, the aircraft 10 contains instrumentation that is in mechanical and/or electronic communication with the forward landing gear system 28 and the actuation mechanism 54 of the main landing gear systems 30 wherein the instrumentation can receive an input from either a pilot, a computer, and/or an outside electronic or radio signal. FIG. 5 is a flowchart of a method 100 of extending the forward landing gear system 28 and the main landing gear systems 30 using an input to the instrumentation. In step 102 of the method 100, while the forward landing gear system 28 and the main landing gear systems 30 are in the stowage position, the instrumentation receives an input to extend the forward landing gear system 28 and main landing gear systems 30. In step 104, the forward landing gear system 28 and the main landing gear systems 30 extend from the stowage position to the airplane landing position in response to the received input. In steps 106a,b, the instrumentation then determines whether the aircraft 10 is in the forward flight mode, the alternate forward flight mode, or the helicopter flight mode. In step 108, if the aircraft 10 has been determined to be in the helicopter flight mode, the main landing gear systems 30 are moved to the VTOL landing position. Alternatively, in step 110, if the aircraft 10 has been determined to be in the forward flight mode or the alternate forward flight mode, the main landing gear systems 30 remain in the airplane landing position. It should be noted that a method similar to method 100 could also be used to independently move the left and right main landing gear systems 30 instead of synchronously.

Figure 6:
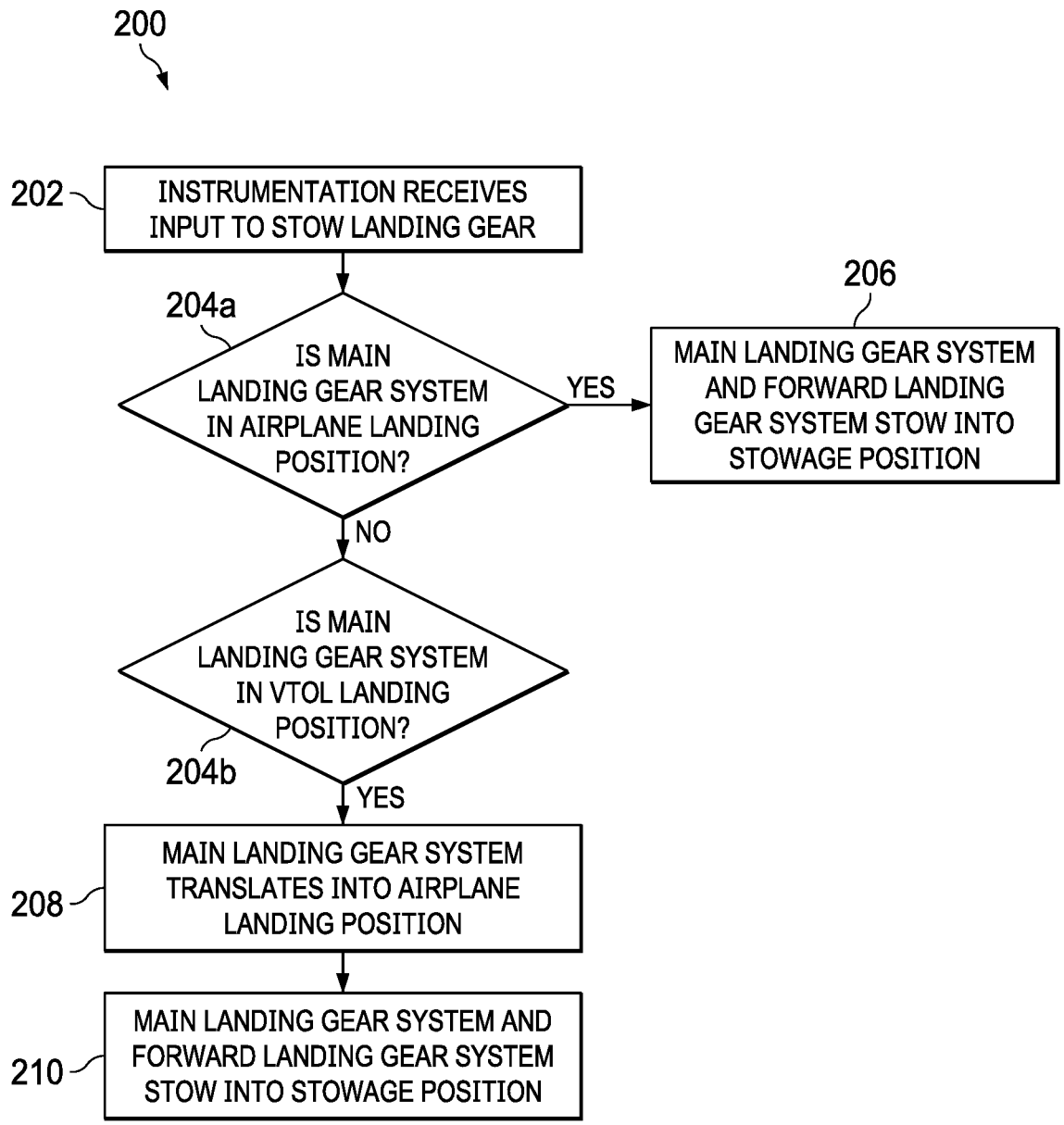
FIG. 6 is a flowchart of a method 200 for stowing a landing gear.

FIG. 6 is a flowchart of a method 200 of stowing a forward landing gear system 28 and main landing gear systems 30 using an input to the instrumentation. In step 202 of method 200, while the forward landing gear system 28 and main landing gear systems 30 are extended, the instrumentation receives an input to stow the forward landing gear system 28 and main landing gear systems 30. In steps 204a,b, the instrumentation determines whether the main landing gear systems 30 are in the airplane landing position or VTOL landing position. In step 206, if the main landing gear systems 30 are determined to be in the airplane landing position, the forward landing gear system 28 and the main landing gear systems 30 are moved into the stowage position in response to the determination. Alternatively, in step 208, if the main landing gear systems 30 are determined to be in the VTOL landing position, the main landing gear systems 30 are moved into the airplane landing position. Then, in step 210, after the main landing gear systems 30 are moved into the airplane landing position, the forward landing gear system 28 and the main landing gear systems 30 are moved into the stowage position. It should be noted that a method similar to method 200 could also be used to independently move the left and right main landing gear systems 30 instead of synchronously.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C"

should each be interpreted to include only A, only B, only C, or any combination of A, B, and C.

What is claimed is:

1. A landing gear assembly for an aircraft comprising:
a landing member;
an actuation mechanism coupled to the landing member, the actuation mechanism configured to selectively actuate the landing member into a first landing position and a second landing position;
wherein the landing member is configured to support the aircraft in either the first landing position or the second landing position;
wherein the first landing position is an airplane landing position and the second landing position is a VTOL landing position.

2. The landing gear assembly according to claim 1, wherein the landing member comprises:
a tire tread;
a wheel axle;
an axle spindle;
and an axle spindle axis.

3. The landing gear assembly according to claim 2, wherein the axle spindle axis is positioned further forward in the first landing position than in the second landing position.

4. The landing gear assembly according to claim 3, wherein the axle spindle axis is positioned further upward in the VTOL landing position than in the airplane landing position.

5. The landing gear assembly according to claim 3, wherein the actuation mechanism is configured to stow the landing member into a stowage position, wherein the stowage position is located within an interior space of the aircraft.

6. The landing gear assembly according to claim 5, wherein the actuation mechanism stows the landing member between the first landing position and the stowage position.

7. The landing gear assembly according to claim 6, wherein the actuation mechanism further comprises:
a first actuator;
a first actuator axis;
a second actuator; and
a second actuator axis;
wherein the first actuator independently actuates the landing member about the first actuator axis between the first landing position and the second landing position and the second actuator independently actuates the landing member about the second actuator axis between the first landing position and the stowage position.

8. The landing gear assembly according to claim 3, further comprising:
a strut coupled to the axle spindle and the actuation mechanism.

9. The landing gear assembly according to claim 8, wherein the strut is at least partially elastic and is allowed to oscillate between multiple positions.

10. A method of using a flight control system in mechanical and electronic communication with a landing gear assembly, comprising:
commanding an actuation mechanism;
selectively translating a landing member between a first landing position and a second landing position;
wherein the landing member is configured to support the aircraft in either the first landing position or the second landing position;
wherein the first landing position is an airplane landing position and the second landing position is a VTOL landing position.

11. The method of claim 10, further comprising:
stowing the landing member with the actuation mechanism into a stowage position.

12. The method of claim 11, further comprising:
determining whether a landing member is in the first landing position, the second landing position, or the stowage position;
stowing and selectively translating a landing member from the first landing position to the stowage position;
stowing and selectively translating a landing member from the second landing position to the stowage position.

13. The method of claim 12, further comprising:
determining whether an aircraft is in a helicopter flight mode or a forward flight mode;
stowing and selectively translating a landing member from the stowage position to the first landing position, if the aircraft is in the forward flight mode;
stowing and selectively translating a landing member from the stowage position to the second landing position, if the aircraft is in the helicopter flight mode.

14. An aircraft having a center of gravity, the aircraft comprising:
a fuselage;
a first landing member comprising:
a first wheel assembly comprising;
a first tire;
a first wheel axle; and
a first axle spindle;
a first actuation mechanism coupled to the first landing member and configured to selectively move the first landing member to a first landing position, a second landing position, and positions there between;
wherein the first landing member is configured to support the aircraft in each of the first landing position and the second landing position;
wherein the first landing position is an airplane landing position and the second landing position is a VTOL landing position.

15. The aircraft according to claim 14, wherein when the first landing gear is in the airplane landing position, a line between an axle spindle axis of the first wheel axle and the center of gravity form a first angle relative to a vertical axis that passes through the center of gravity and wherein when the first landing gear is in the VTOL landing position, a line between the axle spindle axis of the first wheel axle and the center of gravity form a second angle; and
wherein the second angle is larger than the first angle.

16. The aircraft according to claim 15, wherein, the first angle is between 10 degrees and 20 degrees, and the second angle is between 25 degrees and 35 degrees.

17. The aircraft according to claim 14 further comprising:
a second landing member comprising:
a second wheel assembly comprising;
a second tread;
a second wheel axle; and
a second axle spindle;
a second actuation mechanism coupled to the second landing member configured to selectively actuate the second landing member into a first landing position, a second landing position, and positions there between;
wherein the second landing member is configured to support the aircraft in either the first landing position or the second landing position;

wherein the first landing position is an airplane landing position and the second landing position is a VTOL landing position; and wherein the second landing member is symmetrically aligned with the first landing member about the width of the aircraft.

18. The aircraft according to claim 17, wherein the first actuation mechanism and second actuation mechanism are configured to simultaneously actuate the first landing member and second landing member between the first landing position, the second landing position, and positions there between.

19. The aircraft according to claim 18, wherein the first actuation mechanism and second actuation mechanism are configured to simultaneously stow the first landing member and second landing member into a stowage position, wherein the stowage position is located within an interior space of the aircraft.

20. The aircraft according to claim 14 further comprising:
a forward landing member comprising;
   a forward wheel assembly comprising;
     a forward tread;
     a forward wheel axle; and
     a forward axle spindle;
wherein the forward landing gear is in front of the first landing member.

* * * * *